United States Patent [19]

Joseph

[11] 4,406,702

[45] Sep. 27, 1983

[54] ADDITIVE COMPOSITIONS FOR HYDRAULIC CEMENT BASE MIXTURES

[76] Inventor: Christian M. Joseph, Le Pre St. Aubin, Auzouer, Chateaurenault, Indre et Loire, France

[21] Appl. No.: 11,888

[22] Filed: Feb. 13, 1979

[30] Foreign Application Priority Data

Jan. 20, 1978 [FR] France .................. 78 02246

[51] Int. Cl.$^3$ .................. C04B 31/30; B01F 17/04
[52] U.S. Cl. .................. 106/90; 252/353; 252/354; 106/314
[58] Field of Search ............. 106/90, 308, 314, 315; 252/353, 354

[56] References Cited

U.S. PATENT DOCUMENTS

| | | | |
|---|---|---|---|
| 3,234,154 | 2/1966 | Martin | 106/90 X |
| 3,676,541 | 7/1972 | Nishi et al. | 106/90 X |
| 3,677,780 | 7/1972 | Nishi et al. | 106/90 |
| 3,686,133 | 8/1972 | Hattori et al. | 106/90 X |

FOREIGN PATENT DOCUMENTS

| | | | |
|---|---|---|---|
| 2451357 | 6/1976 | Fed. Rep. of Germany | 106/90 |
| 47-26411 | 7/1972 | Japan | 106/90 |

*Primary Examiner*—G. O. Peters
*Attorney, Agent, or Firm*—Browdy and Neimark

[57] ABSTRACT

Additive compositions, made up essentially of a mixture of a salt of a very high molecular weight condensation product of naphthalenesulfonic acid with formaldehyde, containing not less than 35% by weight of the condensation products with a molecular weight greater than 5000, together with a glucoheptonic acid salt, are mixed with hydraulic cement to reduce the water which needs to be added, and to provide improved strength.

10 Claims, No Drawings

ADDITIVE COMPOSITIONS FOR HYDRAULIC CEMENT BASE MIXTURES

FIELD OF INVENTION

The invention relates to improved hydraulic cement, and, more particularly, to additive compositions for mixture with hydraulic cement.

BACKGROUND OF INVENTION

In this description, the term "cement" is used to designate silicate cement compositions such as Portland cement, pozzolan cements, hydraulic limes and natural cements.

In whatever form it is used—tempered cement, mortar or concrete—a good mixture based on hydraulic cement as the binder should give entirely satisfactory results from the triple viewpoint of preservation, mechanical resistance and economy. It is well known that if the conditions of preservation and resistance are to be met satisfactorily, independently of the economic factor, the use of a minimal amount of water required to make the mixture in the useful period when it can be worked, is of vital importance. To reduce the proportion of this mixture water, suitable agents called "thinners" or "water reducers", making it possible to work with less water, are ordinarily used in preparing mortar and concrete.

It can be assumed that the mechanism that makes it possible to reduce the proportion of water necessary by use of water reducing agents is such that the resulting water-reducing effect is produced synergistically by one of the two following modes of operation: by the first mode, a cement dispersion is created which homogeneously distributes the cement particles themselves and increases the fluidity of the resulting tempered cement, thereby making the dispersion suitable for adequate working with a smaller amount of water than would others otherwise be used. According to the second mode, an air-entraining agent produces very fine separate air bubbles in the mortar, concrete, etc. which air bubbles increase the fluidity of the cement mixture acting like ball bearings, which allows a corresponding reduction of the amount of water required.

Consequently, many water reducing agents used in practice are made up of a cement dispersion agent and an air-entraining agent, and their effects as such depend in great part on the latter constituent.

However, this effect of reducing the amount of water necessary, imparted by an air-entraining agent, is determined by the amount of air that must be entrained by this agent, and it is evident that the effect is increased if a greater amount of air is entrained. An increase in the quantity of air entrainment, on the other hand, is accompanied by a corresponding reduction of the resistance of the hydraulic cement and, for this reason, the amount of air that can be entrained in the concrete or a similar binder and, correlatively, the effect of reducing the amount of water necessary that can be obtained with an air-entraining agent, are limited. If it is desired to obtain an improved effect in this reduction of the amount of water without a corresponding reduction in strength, it is quite essential to find a better dispersion agent for the cement particles.

The effectiveness, as cement particle dispersion agents, of the salts of high molecular weight condensation products of naphthalenesulfonic acid formaldehyde is well known (of Japanese Pat. No. 485,391 and German Pat. No. 1,238,831). Other prior art of interest are U.S. Pat. No. 3,053,673; Belgian Pat. No. 847,038 (French equivalent No. 2,367,028); French Pat. Nos. 1,305,098; and French 1,415,646.

SUMMARY OF INVENTION

It has now been discovered according to the invention that the combined use of a salt of a very high molecular weight condensation product of naphthalenesulfonic acid with formaldehyde, and a glucoheptonic acid salt has considerable effectiveness in increasing the cement dispersion action of the additive composition.

This invention therefore has for an object novel additive compositions for hydraulic cement base mixtures made up of a composition of a salt of a very high molecular weight condensation product of naphthalenesulfonic acid with formaldehyde and a glucoheptonic acid salt.

Another object is to overcome deficiencies in the prior art, such as noted above. A further object is to provide for improved hydraulic cement compositions.

The mixed salts added to the silicate cement is used to provide improved Portland cement, concrete, mortar or a grouting having excellent mechanical resistance and capable of being easily worked. Further, the invention relates to a process for improving the properties of the hydraulic cement base mixtures by addition of the previous association to the cement mixture such as tempered cement, mortar, concrete . . . .

DETAILED DESCRIPTION OF EMBODIMENTS

The term "naphthalenesulfonic acid" covers both α-naphthalenesulfonic acid and β-naphthalenesulfonic acid.

The term "salt of very high molecular weight condensation product of naphthalenesulfonic acid formaldehyde" includes alkali metal salts, such as sodium and potassium salts; and alkaline-earth metal salts, such as calcium and magnesium salts; and water soluble salts such as ammonium salt and amine salts (triethanolamine, for example), that have characteristics similar to alkaline-earth salts, of a very high molecular weight condensation product obtained by condensing a naphthalenesulfonic acid and formaldehyde according to the following general formula:

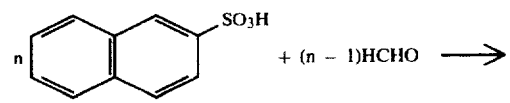

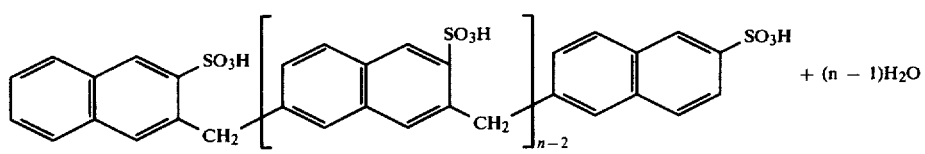

by processes well known in the prior art, and described, for example, in "PB Report FIAT Final Report No. 1141."

Thus, it is possible to synthesize a very high molecular weight condensation product by using 1.4 to 2 moles of concentrated sulfuric acid and a mole of formaldehyde for each mole of naphthalene, and continuing the condensation to the desired degree of condensation. The condensation products that can be used in the additive composition according to the invention should at a minimum contain more than 35% by weight of very high molecular weight condensation products (MW > 5000, determined by gel filtration chromatography). Before use, the condensation product is converted into sodium, potassium, calcium, ammonium, or triethanolamine salt or other suitable salt, by known procedure.

The glucoheptonic acid salts used in the additive composition according to the invention comprise sodium, potassium, lithium and calcium salts of this acid.

The mixture ratio between the salt of the very high molecular weight condensation product (MW > 5000) of naphthalenesulfonic acid formaldehyde and glucoheptonic acid salt in the additive composition according to the invention is preferably on the order of 30 to 90% of the first per 70 to 10% of the second, these percentages being by weight, although in practice other ratios may give a good result, provided they are suitably proportioned in the ratio between additive composition and cement.

The composition according to the invention can be used either as dehydrated powder or an aqueous solution in a concentration that can amount to about 40%, depending on the nature of the salt of the very high molecular weight condensation product of naphthalenesulfonic acid formaldehyde.

Addition to the cement can be made in a proportion from 0.01 to 3 parts per hundred, preferably from 0.1 to 1 part of the mixed salts per hundred parts of the cement.

The composition according to the invention can be premixed in the hydraulic cement or added to the concrete, mortar, tempered cement, etc. at the time of mixing. It can be used alone or in association with other auxiliary agents such as a hardening accelerator, hardening retardant and/or an air-entraining agent.

Addition of the dispersion agent compositions according to the invention has an extremely favorable effect on the dispersion capacity of the hydraulic cement; it makes possible a remarkable reduction of the amount of mixture water necessary for tempering a hydraulic cement base mixture such as mortar or concrete, while it increases the resistance of the cement.

This invention will be better understood from the following examples that describe, in a non-limiting way, the improvements obtained with the compositions according to the invention. In these examples, the parts per hundred are given by weight, unless otherwise indicated. All tests were made with natural pozzolan high resistance Portland cement, symbolically called "CPAZ 325" according to French standard NF P 15-302. Further, in these examples, there were used various salts of the very high molecular weight condensation product of naphthalenesulfonic acid formaldehyde prepared by the process described above.

EXAMPLE 1

Measurements were made of the fluidizing power and dispersion of Portland cement CPAZ 325 containing mixtures of different proportions of sodium salt of the very high molecular weight condensation product of naphthalenesulfonic acid formaldehyde, hereafter called NSF Na, and of sodium glucoheptonate, hereafter called GH Na.

Principle

There is determined the amount of water expressed by the ratio of water to cement W/C to be added to the pure cement or that modified by the additive composition under study so that a determined penetration probe (called consistency probe and defined by standard NF-P 15-414) sinks in a defined manner into the resulting paste (standard paste according to NF-P 15-402). This determination is made for various doses of the additive composition used and the reduction of the rate of tempering to obtain a standard paste as a function of the doses of the additive compositions is stated.

Mode of operation

Standard pastes were prepared according to standard NF-P 15-402 from 500 g of pure cement or that modified by the additive composition under study, and the amount of water was adjusted so that the consistency would be normal with a Vicat apparatus and its accessories defined by standard NF-P 15-414. For the first test, 30 parts per hundred of water in relation to the cement were used. The conditions for temperature and relative humidity and quality of water used met the provisions of standard NF-P 15-401, i.e., temperature of the workroom, of the equipment and materials used in the tests = 20° C. ±2° C., relative humidity ≦65%; the water used in the tests was drinking water containing little sulfate.

The results are given in Table 1.

TABLE 1

| Additive compositions percentage (%) of two constituents NSF/Na  GH Na | Amount added to the cement (parts per hundred by weight) | | | | | | | |
|---|---|---|---|---|---|---|---|---|
| | 0 | | 0.1 | | 0.3 | | 0.5 | |
| | $\frac{W}{C}$ in % | $\Delta \frac{W}{C}$ in % | $\frac{W}{C}$ in % | $\Delta \frac{W}{C}$ in % | $\frac{W}{C}$ in % | $\Delta \frac{W}{C}$ in % | $\frac{W}{C}$ in % | $\Delta \frac{W}{C}$ in % |

TABLE 1-continued

| | | | | | | | | | |
|---|---|---|---|---|---|---|---|---|---|
| 0 | 0 | 26.67 | — | | | | | | |
| 100 | 0 | | | 25.67 | 1.00 | 24.67 | 2.00 | 23.67 | 3.00 |
| 90 | 10 | | | 25.33 | 1.34 | 24.67 | 2.00 | 22.67 | 4.00 |
| 80 | 20 | | | 25.33 | 1.34 | 24.33 | 2.34 | 23.00 | 3.67 |
| 60 | 40 | | | 25.33 | 1.34 | 24.00 | 2.67 | 22.67 | 4.00 |
| 40 | 60 | | | 25.33 | 1.34 | 24.00 | 2.67 | 23.33 | 3.34 |
| 0 | 100 | | | 26.00 | 0.67 | 25.00 | 1.67 | 24.33 | 2.34 |

| Additive compositions percentage (%) of two constituents | | Amount added to the cement (parts per hundred by weight) | | | | | |
|---|---|---|---|---|---|---|---|
| | | 0.7 | | 0.9 | | 1.1 | |
| NSF/Na | GH Na | $\frac{W}{C}$ in % | $\Delta \frac{W}{C}$ in % | $\frac{W}{C}$ in % | $\Delta \frac{W}{C}$ in % | $\frac{W}{C}$ in % | $\Delta \frac{W}{C}$ in % |
| 0 | 0 | | | | | | |
| 100 | 0 | 23.00 | 3.67 | 22.23 | 4.44 | 22.23 | 4.44 |
| 90 | 10 | 21.33 | 5.34 | 21.00 | 5.67 | 21.00 | 5.67 |
| 80 | 20 | 21.67 | 5.00 | 21.33 | 5.34 | 21.33 | 5.34 |
| 60 | 40 | 22.33 | 4.34 | 22.00 | 4.67 | 22.00 | 4.67 |
| 40 | 60 | 22.67 | 4.00 | 22.67 | 4.00 | | |
| 0 | 100 | 24.00 | 2.67 | 24.00 | 2.67 | | |

$\frac{W}{C}$ in % = rate of tempering to have a paste with normal consistency $\Delta \frac{W}{C}$ in % = reduction of tempering rate to have a paste of normal consistency when the additive composition is used $\Delta \frac{W}{C}$ in % = $\left(\frac{W}{C} \text{ in } \% \right)$ pure cement − $\left(\frac{W}{C} \text{ in } \% \right)$ cement modified by the additive composition As can be seen from this table, the combined use of the sodium salt of the very hight molecular weight condensation product of naphthalenesulfonic acid formaldehyde and sodium glucoheptonate assures a very marked improvement in the fluidizing effect and dispersion of the cement in comparison with the cases where only one of the two constituents is used.

As can be seen from this table, the combined use of the potassium salt of the very high molecular weight condensation product of naphthalenesulfonic acid formaldehyde and potassium glucoheptonate assures a very marked improvement in the fluidizing effect and dispersion of the cement in comparison with the cases where only one of the two constituents is used.

EXAMPLE 2

Measurements were made of the fluidizing power and dispersion of Portland cement CPAZ 325 containing mixtures of different proportions of potassium salt of the very high molecular weight condensation product of naphthalenesulfonic acid formaldehyde NSF K and of potassium glucoheptonate GH K according to the same principle and same mode of operation as in Example 1.

The results are shown in Table 2.

EXAMPLE 3

Measurements were made of the fluidizing power and dispersion of Portland cement CPAZ 325 containing mixtures of different proportions of ammonium salt of the very high molecular weight condensation product of naphthalenesulfonic acid formaldehyde NSF NH₄ and sodium glucoheptonate GH Na according to the same principle and same mode of operation as in Example 1.

The results are shown in Table 3.

TABLE 2

| Additive compositions percentage (%) of two constituents | | Amount added to the cement (parts per hundred by weight) | | | | | | | |
|---|---|---|---|---|---|---|---|---|---|
| | | 0 | | 0.1 | | 0.3 | | 0.5 | |
| NSF/K | GH K | $\frac{W}{C}$ in % | $\Delta \frac{W}{C}$ in % | $\frac{W}{C}$ in % | $\Delta \frac{W}{C}$ in % | $\frac{W}{C}$ in % | $\Delta \frac{W}{C}$ in % | $\frac{W}{C}$ in % | $\Delta \frac{W}{C}$ in % |
| 0 | 0 | 26.67 | — | | | | | | |
| 100 | 0 | | | 25.67 | 1.00 | 24.67 | 2.00 | 23.67 | 3.00 |
| 90 | 10 | | | 25.33 | 1.34 | 24.33 | 2.34 | 22.67 | 4.00 |
| 80 | 20 | | | 25.00 | 1.67 | 24.00 | 2.67 | 22.67 | 4.00 |
| 60 | 40 | | | 25.33 | 1.34 | 24.00 | 2.67 | 22.67 | 4.00 |
| 40 | 60 | | | 25.33 | 1.34 | 24.00 | 2.67 | 23.00 | 3.67 |
| 0 | 100 | | | 26.00 | 0.67 | 25.00 | 1.67 | 24.00 | 2.67 |

| Additive compositions percentage (%) of two constituents | | Amount added to the cement (parts per hundred by weight) | | | | | |
|---|---|---|---|---|---|---|---|
| | | 0.7 | | 0.9 | | 1.1 | |
| NSF/K | GH K | $\frac{W}{C}$ in % | $\Delta \frac{W}{C}$ in % | $\frac{W}{C}$ in % | $\Delta \frac{W}{C}$ in % | $\frac{W}{C}$ in % | $\Delta \frac{W}{C}$ in % |
| 0 | 0 | | | | | | |
| 100 | 0 | 23.00 | 3.67 | 22.23 | 4.44 | 22.00 | 4.67 |
| 90 | 10 | 22.00 | 4.67 | 21.33 | 5.34 | 21.33 | 5.34 |
| 80 | 20 | 22.00 | 4.67 | 21.67 | 5.00 | 21.67 | 5.00 |
| 60 | 40 | 22.23 | 4.34 | 22.00 | 4.67 | 22.00 | 4.67 |
| 40 | 60 | 22.67 | 4.00 | 22.67 | 4.00 | | |
| 0 | 100 | 24.00 | 2.67 | 24.00 | 2.67 | | |

TABLE 3

| Additive compositions percentage (%) of two constituents | | Amount added to the cement (parts per hundred by weight) | | | | | | | |
|---|---|---|---|---|---|---|---|---|---|
| | | 0 | | 0.1 | | 0.3 | | 0.5 | |
| NSF/NH$_4$ | CH Na | $\frac{W}{C}$ in % | $\Delta \frac{W}{C}$ in % | $\frac{W}{C}$ in % | $\Delta \frac{W}{C}$ in % | $\frac{W}{C}$ in % | $\Delta \frac{W}{C}$ in % | $\frac{W}{C}$ in % | $\Delta \frac{W}{C}$ in % |
| 0 | 0 | 26.67 | — | | | | | | |
| 100 | 0 | | | 25.67 | 1.00 | 24.00 | 2.67 | 22.10 | 4.67 |
| 90 | 10 | | | 25.33 | 1.34 | 23.33 | 3.34 | 21.67 | 5.00 |
| 80 | 20 | | | 25.33 | 1.34 | 23.67 | 3.00 | 21.67 | 5.00 |
| 60 | 40 | | | 25.67 | 1.00 | 23.67 | 3.00 | 22.10 | 4.67 |
| 40 | 60 | | | 25.67 | 1.00 | 23.67 | 3.00 | 22.10 | 4.67 |
| 0 | 100 | | | 26.00 | 0.67 | 25.00 | 1.67 | 24.33 | 2.34 |

| Additive compositions percentage (%) of two constituents | | Amount added to the cement (parts per hundred by weight) | | | | | |
|---|---|---|---|---|---|---|---|
| | | 0.7 | | 0.9 | | 1.1 | |
| NSF/NH$_4$ | CH Na | $\frac{W}{C}$ in % | $\Delta \frac{W}{C}$ in % | $\frac{W}{C}$ in % | $\Delta \frac{W}{C}$ in % | $\frac{W}{C}$ in % | $\Delta \frac{W}{C}$ in % |
| 0 | 0 | | | | | | |
| 100 | 0 | 21.33 | 5.34 | 21.00 | 5.67 | 20.67 | 6.00 |
| 90 | 10 | 21.00 | 5.67 | 20.67 | 6.00 | 20.33 | 6.34 |
| 80 | 20 | 21.00 | 5.67 | 20.67 | 6.00 | 20.33 | 6.34 |
| 60 | 40 | 21.67 | 5.00 | 21.33 | 5.34 | 21.33 | 5.34 |
| 40 | 60 | 21.67 | 5.00 | 21.33 | 5.34 | 21.33 | 5.34 |
| 0 | 100 | 24.00 | 2.67 | 24.00 | 2.67 | | |

As can be seen from this table, the combined use of the ammonium salt of the very high molecular weight condensation product of naphthalenesulfonic acid formaldehyde and sodium glucoheptonate assures a very marked improvement in the fluidizing effect and dispersion of the cement in comparison with the cases where only one of the two constituents is used.

EXAMPLE 4

Measurements were made of the fluidizing power and dispersion of Portland cement CPAZ 325 containing the following additive compositions to compare their effect on the dispersion according to the same principle and same mode of operation as in Example 1.

Additive compositions (all parts indicated are by weight):

A: sodium salt of the very high molecular weight condensation product of naphthalenesulfonic acid formaldehyde used alone.

B: ammonium salt of the very high molecular weight condensation product of naphthalenesulfonic acid formaldehyde used alone.

C: sodium glucoheptonate used alone.

D: mixture of 80 parts of the sodium salt of the very high molecular weight condensation product of naphthalene-sulfonic acid formaldehyde and 20 parts of sodium glucoheptonate.

E: mixture of 90 parts of the ammonium salt of the very high molecular weight condensation product of naphthalene-sulfonic acid formaldehyde and 10 parts of sodium glucoheptonate.

F: mixture of 80 parts of calcium salt of the very high molecular weight condensation product of naphthalenesulfonic acid formaldehyde and 20 parts of sodium glucoheptonate.

G: sodium lignosulfonate.

The results are given in Table 4.

TABLE 4

| Additive compositions | Amount added to the cement (parts by hundred by weight) | | | | | | | | |
|---|---|---|---|---|---|---|---|---|---|
| | 0 | 0.1 | | 0.3 | | 0.5 | | 0.7 | |
| | $\frac{W}{C}$ in % | $\frac{W}{C}$ in % | $\Delta \frac{W}{C}$ in % | $\frac{W}{C}$ in % | $\Delta \frac{W}{C}$ in % | $\frac{W}{C}$ in % | $\Delta \frac{W}{C}$ in % | $\frac{W}{C}$ in % | $\Delta \frac{W}{C}$ in % |
| Nothing: (pure cement) | 26.67 | | | | | | | | |
| A | | 25.67 | 1.00 | 24.67 | 2.00 | 23.67 | 3.00 | 23.00 | 3.67 |
| B | | 25.67 | 1.00 | 24.00 | 2.67 | 22.10 | 4.67 | 21.33 | 5.34 |
| C | | 26.00 | 0.67 | 25.00 | 1.67 | 24.33 | 2.34 | 24.00 | 2.67 |
| D | | 25.33 | 1.34 | 24.33 | 2.34 | 23.00 | 3.67 | 21.67 | 5.00 |
| E | | 25.33 | 1.34 | 23.33 | 3.34 | 21.67 | 5.00 | 21.00 | 5.67 |
| F | | 25.00 | 1.67 | 24.00 | 2.67 | 22.10 | 4.67 | 21.33 | 5.34 |
| G | | 26.33 | 0.34 | 25.67 | 1.00 | 25.00 | 1.67 | 24.33 | 2.34 |

| Additive compositions | Amount added to the cement (parts by hundred by weight) | | | |
|---|---|---|---|---|
| | 0.9 | | 1.1 | |
| | $\frac{W}{C}$ in % | $\Delta \frac{W}{C}$ in % | $\frac{W}{C}$ in % | $\Delta \frac{W}{C}$ in % |
| Nothing: (pure cement) | | | | |
| A | 22.23 | 4.44 | 21.67 | 5.00 |
| B | 21.00 | 5.67 | 20.67 | 6.00 |
| C | 24.00 | 2.67 | | |
| D | 21.33 | 5.34 | 21.00 | 5.67 |

TABLE 4-continued

|   |       |      |       |      |
|---|-------|------|-------|------|
| E | 20.67 | 6.00 | 20.33 | 6.34 |
| F | 21.00 | 5.67 | 20.67 | 6.00 |
| G | 23.67 | 3.00 | 23.33 | 3.34 |

As clearly appears from this table, the dispersion effects that can be obtained with additive compositions D, E and F, according to the invention, are much greater than those assured by the individual constituents of these compositions used alone and by a standard cement dispersion agent, sodium lignosulfonate.

EXAMPLE 5

Mechanical tests were made (test of rupture by bending and tests of rupture by compression) of standard mortar (according to standard NF-P 15-403) and mortar modified by the following additive compositions, but having the same plasticity as standard mortar.

Additive compositions (all parts indicated are by weight):

H: mixture of 85 parts of the sodium salt of the very high molecular weight condensation product of naphthalenesulfonic acid formaldehyde and 15 parts of sodium glucoheptonate.

A: sodium salt of the very high molecular weight condensation product of napthalenesulfonic acid formaldehyde used alone.

I: tempering water reducing agent of the lignosulfonate type available on the market.

The mechanical tests were made according to standard NF-P 15-451. The molds and accessories used to make prismatic samples 4×4×16 cm are those described in standard NF-P 15-413. Standard reference mortar was prepared according to standard NF-P 15-403 with the mixer specified by standard NF-P 15-411.

To adjust the plasticity of the mortars modified by the additive compositions under study to that of the normal reference mortar, the Abrams' cone method or slump test was used. The slump test consists in measuring the slump "s" of a mortar cone. The mold used for the mortars is a frustum of cone having a diameter of 6.5 cm at the base and 5 cm at the summit and 9 cm high. The modified mortar whose plasticity it was desired to adjust was prepared with the mixer specified by standard NF-P 15-411, its composition being:

Standard dry sand—1350
Cement—450
Additive composition—x
Water—y

The mortar thus made was introduced into the mold in four layers of equal thickness and tamped 20 strokes per layer with a rod 10 mm in diameter. After two minutes waiting, the mold was lifted vertically. The mortar formed a paste that slumped more or less. The value of the slump "s" represented the plasticity of the mortar. So that the plasticity would be identical with that of a standard reference mortar (similar slump "s"), "y" was adjusted.

Table 5 gives the composition of the various mortars, the test results are shown in Table 6.

TABLE 5

| Additive compositions | Dose: ppH in dry/cement | Ratio $\frac{W}{C}$ in % | Plasticity Slump "s" in mm | Standard sand grams | Cement grams | Water grams |
|---|---|---|---|---|---|---|
| Nothing: pure cement | — | 50 | 15 | 1350 | 450 | 225 |
| H | 0.20 | 45.4 | 16 | 1350 | 450 | 204.75 |
|   | 0.30 | 44 | 15 | 1350 | 450 | 198 |
|   | 0.40 | 43 | 16 | 1350 | 450 | 193.5 |
| A | 0.20 | 47 | 14 | 1350 | 450 | 211.5 |
|   | 0.30 | 46 | 16 | 1350 | 450 | 207 |
|   | 0.40 | 45 | 15 | 1350 | 450 | 202.5 |
| I | 0.20 | 48.5 | 14 | 1350 | 450 | 218.25 |
|   | 0.30 | 47.5 | 15 | 1350 | 450 | 213.75 |
|   | 0.40 | 47 | 15 | 1350 | 450 | 211.5 |

TABLE 6

| Additive compositions | Dose: pph in dry/cement | Water reduction in % | Air content in % | Compression rupture stress: $R_c$ in bars | | | Traction rupture stress by bending: $R_f$ in bars | | |
|---|---|---|---|---|---|---|---|---|---|
|   |   |   |   | 3rd day | 7th day | 28th day | 3rd day | 7th day | 28th day |
| Nothing: pure cement | — | — | 1.5 | 221 | 254 | 335 | 45 | 52,6 | 80 |
| H | 0.20 | 9 | 2.0 | 244 | 300 | 396 | 50 | 61 | 120 |
|   | 0.30 | 12 | 2.3 | 255 | 306 | 421 | 59 | 72 | 135 |
|   | 0.40 | 14 | 2.4 | 263 | 310 | 452 | 69 | 85 | 155 |
| A | 0.20 | 6 | 1.6 | 236 | 275 | 365 | 48 | 56 | 108 |
|   | 0.30 | 8 | 1.8 | 240 | 280 | 371 | 53 | 65 | 122 |
|   | 0.40 | 10 | 1.7 | 242 | 284 | 389 | 59 | 71 | 130 |
| I | 0.20 | 3 | 2.2 | 228 | 261 | 342 | 46 | 54 | 90 |
|   | 0.30 | 5 | 2.1 | 226 | 258 | 339 | 45.5 | 53.5 | 88 |
|   | 0.40 | 6 | 2.0 | 227 | 259 | 341 | 46 | 54.5 | 90 |

As can be seen from Table 4, the additive compositions according to the invention are remarkably advantageous in that they make it possible considerably to reduce the amount of water necessary to have a given plasticity and to increase mechanical resistances of the cement thus modified, in comparison with the water reducing agent of the lignosulfonate type (I) very widely used, and with the very high molecular weight condensation product of naphthalenesulfonic acid formaldehyde (A) used alone.

Naturally, various modifications can be made by a man of the art in the devices and processes just described solely by way of non-limiting examples without going outside the scope of the invention.

What is claimed is:

1. Additive composition for hydraulic cement base mixtures consisting essentially of a salt of a very high molecular weight condensation product of naphthalenesulfonic acid with formaldehyde, wherein at least 35% by weight of said condensation product has a molecular weight greater than 5000, and a glucoheptonic acid salt.

2. Additive composition according to claim 1, wherein the mixture ratio of said salt of the very high molecular weight condensation product of naphthalenesulfonic acid formaldehyde to the glucoheptonic acid salt is between approximately 30 and 90% by weight of the first for approximately 70 to 10% by weight of the second.

3. Additive composition according to claim 1, wherein the salt of the high molecular weight condensation product is selected from the group consisting of alkali metal salts, alkaline-earth metal salts, ammonium salt and water soluble amine salts.

4. Additive compositions according to claim 1, wherein the glucoheptonic acid salt is selected from the group consisting of sodium, lithium, potassium and calcium salts.

5. Process of preparing easy to-dispense hydraulic cement base compositions comprising adding to the tempering water of cement, concrete, mortar, cement tempered at the time of mixing, an additive composition according to any of claims 1 to 4, in an amount from 0.01 to 3 parts per hundred of said additive composition per hundred, expressed in dry material in relation to the hydraulic cement.

6. Process according to claim 5, wherein said additive composition is used in an amount of from 0.1 to 1 part per 100 parts cement.

7. Improved hydraulic cement base preparations obtained according to the process of claim 5.

8. Process of preparing easy-to-disperse hydraulic cement base composition comprising mixing with dry cement in powder form an additive composition according to any one of claims 1-4, in an amount from 0.01 to 3 parts per hundred of said additive composition per hundred, expressed in dry material in relation to the hydraulic cement.

9. Process according to claim 8, wherein said additive composition is used in an amount of from 0.1 to 1 part per 100 parts cement.

10. Improved hydraulic cement base preparations obtained according to the process of claim 8.

* * * * *